(12) United States Patent
Jordan et al.

(10) Patent No.: US 7,210,032 B2
(45) Date of Patent: Apr. 24, 2007

(54) METHOD FOR INITIALIZING MULTIFUNCTION HANDHELD DEVICE BY DOWNLOADING SECOND BOOT ALGORITHM FROM A COUPLED HOST IF SECOND BOOT ALGORITHM IN THE HANDHELD DEVICE IS NOT EXECUTABLE

(75) Inventors: Marc Kevin Jordan, Austin, TX (US); Thomas A. Zudock, Austin, TX (US); Russell Alvin Schultz, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 341 days.

(21) Appl. No.: 10/723,665

(22) Filed: Nov. 26, 2003

(65) Prior Publication Data
US 2004/0111598 A1   Jun. 10, 2004

Related U.S. Application Data

(60) Provisional application No. 60/429,941, filed on Nov. 29, 2002.

(51) Int. Cl.
*G06F 15/177* (2006.01)

(52) U.S. Cl. ............................................. 713/2; 713/1

(58) Field of Classification Search .................. 713/1, 713/2; 463/42
See application file for complete search history.

(56) References Cited

U.S. PATENT DOCUMENTS

| | | | |
|---|---|---|---|
| 6,202,091 B1 * | 3/2001 | Godse | 709/222 |
| 6,544,126 B2 * | 4/2003 | Sawano et al. | 463/42 |
| 6,839,835 B2 * | 1/2005 | Kawade et al. | 713/2 |
| 2002/0099971 A1 * | 7/2002 | Merkin et al. | 714/6 |
| 2003/0176935 A1 * | 9/2003 | Lian et al. | 700/94 |

* cited by examiner

*Primary Examiner*—Chun Cao
(74) *Attorney, Agent, or Firm*—Garlick Harrison & Markison; Robert A. McLauchlan

(57) ABSTRACT

A method for "booting up" a multiple function device that first involves determining a configuration state of the multiple function device. Based on the configuration state, a functional mode is selected from a number of functional modes. A functional algorithm associated with the selected functional modes is accessed from memory. The functional algorithm is then examined to determine if the algorithm is executable. When the functional algorithm is not executable and the multiple function device is operable coupled to a host, a functional algorithm is downloaded from the host. Otherwise, the device may time-out and is powered down.

26 Claims, 7 Drawing Sheets multi-function handheld device 40

METHOD FOR INITIALIZING MULTIFUNCTION HANDHELD DEVICE BY DOWNLOADING SECOND BOOT ALGORITHM FROM A COUPLED HOST IF SECOND BOOT ALGORITHM IN THE HANDHELD DEVICE IS NOT EXECUTABLE

RELATED APPLICATIONS

This application claims priority under 35 USC § 119(e) to U.S. Provisional Application No. 60/429,941 filed Nov. 29, 2002 entitled, "MULTI-FUNCTION HANDHELD DEVICE", and is incorporated herein by reference in its entirety.

TECHNICAL FIELD OF THE INVENTION

The present invention relates generally to systems and methods to initialize computing systems, and more particularly, a system and method for initializing multiple function devices.

BACKGROUND OF THE INVENTION

As is known, integrated circuits are used in a wide variety of electronic equipment, including portable, or handheld, devices. Such handheld devices include personal digital assistants (PDA), CD players, MP3 players, DVD players, AM/FM radio, a pager, cellular telephones, computer memory extension (commonly referred to as a thumb drive), etc. Each of these handheld devices includes one or more integrated circuits to provide the functionality of the device. For example, a thumb drive may include an integrated circuit for interfacing with a computer (e.g., personal computer, laptop, server, workstation, etc.) via one of the ports of the computer (e.g., Universal Serial Bus, parallel port, etc.) and at least one other memory integrated circuit (e.g., flash memory). As such, when the thumb drive is coupled to a computer, data can be read from and written to the memory of the thumb drive. Accordingly, a user may store personalized information (e.g., presentations, Internet access account information, etc.) on his/her thumb drive and use any computer to access the information.

As another example, an MP3 player may include multiple integrated circuits to support the storage and playback of digitally formatted audio (i.e., formatted in accordance with the MP3 specification). As is known, one integrated circuit may be used for interfacing with a computer, another integrated circuit for generating a power supply voltage, another for processing the storage and/or playback of the digitally formatted audio data, and still another for rendering the playback of the digitally formatted audio data audible. Each of these integrated circuits are configured or initialized by algorithms that allow these circuits to function in a given mode.

Integrated circuits have enabled the creation of a plethora of handheld devices, however, to be "wired" in today's electronic world, a person needs to posses multiple handheld devices. For example, one may own a cellular telephone for cellular telephone service, a PDA for scheduling, address book, etc., one or more thumb drives for extended memory functionality, an MP3 player for storage and/or playback of digitally recorded music, a radio, etc. Thus, even though a single handheld device may be relatively small, carrying multiple handheld devices on one's person can become quite burdensome.

Additionally, integrated circuits that provide multiple functions for handheld devices, associated operations of the integrated circuits, and applications of the integrated circuits must be easily configured for the multiple functions.

Therefore, a need exists for a method of initializing or "booting up" the integrated circuits in any mode of operation without creating an overly complex method of initializing the integrated circuit that results in frequent initialization failures.

SUMMARY OF THE INVENTION

The present invention provides a method for booting up or initializing a multiple function device that substantially addresses these needs and others. This method first involves determining a configuration state of the multiple function device. Based on the configuration state, a functional mode is selected from a number of functional modes. A functional algorithm associated with the selected functional modes is accessed from memory. The functional algorithm is then examined to determine if the algorithm is executable. When the functional algorithm is not executable and the multiple function device is operable coupled to a host, a functional algorithm is downloaded from the host.

In another embodiment, the present invention provides an apparatus for booting up a multiple function device. The apparatus includes a processing module, read only memory, and read/write able memory. The processing module functions to determine a configuration state of the multiple function device. Next the processing module selects one of a plurality of functional modes based on the configuration state. The multiple function handheld device then retrieves a functional algorithm corresponding to the one of the plurality of functional modes. A determination is made as to whether the functional algorithm is executable. If the functional algorithm is un-executable a determination is made as to whether the multiple function device is operably coupled to a host. This allows a functional algorithm to be downloaded from the host and executed.

Another embodiment involves first detecting the activation of the multiple function device. A first ($1^{st}$)boot algorithm, retrieved from read-only memory, is executed to identify the location of a second ($2^{nd}$) boot algorithm. This allows the size and complexity of the $1^{st}$ boot algorithm to be minimized. This also minimizes the user of read-only memory. The $2^{nd}$ boot algorithm, retrieved from a specified location based on the booting inputs, is verified for executability. When the $2^{nd}$ boot algorithm is executable, it is executed to retrieve the functional algorithms that configure the multiple function device in the desired configuration. When the $2^{nd}$ boot algorithm is not executable, and the multiple function device is operably coupled to a host, the correct functional algorithm or a default functional algorithm is downloaded and executed to configure the multiple function device. When an executable functional algorithm cannot be retrieved from memory or the host, the multiple function device powers down after a predetermined amount of time.

Another embodiment provides an apparatus for booting up a multiple function device. This apparatus includes a processing module, a read-only memory, and additional memory. The processing module detects the activation of the multiple function device. Upon activation, the processing module retrieves a $1^{st}$ boot algorithm from the ROM. Execution of the 1st boot algorithm identifies the location of a $2^{nd}$ boot algorithm stored in memory. Next, if the $2^{nd}$ boot algorithm as stored at the identified location is executable, the $2^{nd}$ boot is executed to retrieve one of a number of functional algorithms used to configure the multiple function device into a desired mode.

Should the $2^{nd}$ boot algorithm be unavailable or unexecutable, the processing module downloads a functional algorithm when coupled to a host. This functional algorithm may be the specified functional algorithm or a default functional algorithm. If no functional algorithm is downloaded from the host within a predetermined amount of time, the multiple function device powers down after the expiration of a time-out period.

DETAILED DESCRIPTION OF THE INVENTION

Figure 1:
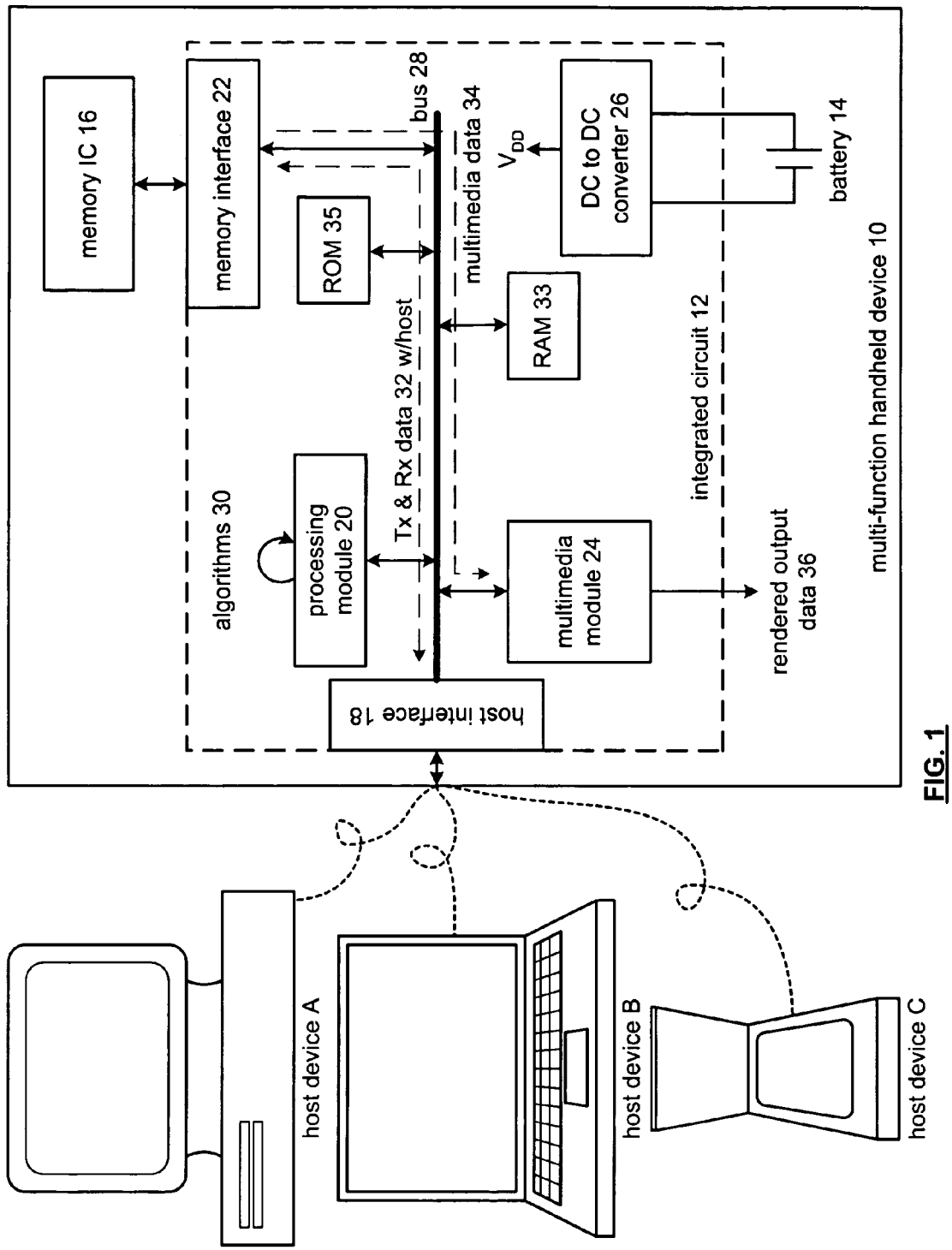
FIG. 1 is a schematic block diagram of a handheld device and corresponding integrated circuit in accordance with the present invention.

FIG. 1 is a schematic block diagram of a multi-function handheld device 10 and corresponding integrated circuit 12 operably coupled to a host device A, B, or C. The multi-function handheld device 10 also includes memory integrated circuit (IC) 16 and a battery 14. The integrated circuit 12 includes a host interface 18, a processing module 20, a memory interface 22, a multimedia module 24, a DC-to-DC converter 26, and a bus 28. The multimedia module 24 alone or in combination with the processing module 20 provides the functional circuitry for the integrated circuit 12. The DC-to-DC converter 26, which may be constructed in accordance with the teaching of U.S. Pat. No. 6,204,651, entitled METHOD AND APPARATUS FOR REGULATING A DC VOLTAGE, provides at least a first supply voltage to one or more of the host interface 18, the processing module 20, the multimedia module 24, and the memory interface 22. The DC-to-DC converter 26 may also provide $V_{DD}$ to one or more of the other components of the handheld device 10.

When the multi-function handheld device 10 is operably coupled to a host device A, B, or C, which may be a personal computer, workstation, server (which are represented by host device A), a laptop computer (host device B), a personal digital assistant (host device C), and/or any other device that may transceive data with the multi-function handheld device, the processing module 20 performs at least one algorithm 30, which will be described in greater detail. The corresponding operational instructions of the algorithm 30 are stored in memory 16 and/or in memory incorporated in or accessible to processing module 20. Processing module 20 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 20 implements one or more of its functions via a state machine, analog circuitry, digital circuitry, and/or logic circuitry, the associated memory storing the corresponding operational instructions is embedded with the circuitry comprising the state machine, analog circuitry, digital circuitry, and/or logic circuitry.

With the multi-function handheld device 10 in the first functional mode, the integrated circuit 12 facilitates the transfer of data between the host device A, B, or C and memory 16, which may be non-volatile memory (e.g., flash memory, disk memory, SDRAM) and/or volatile memory (e.g., DRAM). In one embodiment, the memory IC 16 is a NAND flash memory that stores both data and the operational instructions of at least some of the algorithms 30. The interoperability of the memory IC 16 and the integrated circuit 12 will be described in greater detail.

In this mode, the processing module 20 retrieves a first set of operational instructions (e.g., a file system algorithm, which is known in the art) from the memory 16 to coordinate the transfer of data. For example, data received from the host device A, B, or C (e.g., Rx data) is first received via the host interface module 18. Depending on the type of coupling between the host device and the handheld device 10, the received data will be formatted in a particular manner. For example, if the handheld device 10 is coupled to the host device via a USB cable, the received data will be in accordance with the format proscribed by the USB specification. The host interface module 18 converts the format of the received data (e.g., USB format) into a desired format by removing overhead data that corresponds to the format of the received data and storing the remaining data as data words. Under the control of processing module 20, the data words are provided, via the memory interface 22, to memory 16 for storage. In this mode, the handheld device 10 is functioning as extended memory of the host device (e.g., like a thumb drive).

In furtherance of the first functional mode, the host device may retrieve data (e.g., Tx data) from memory 16 as if the memory were part of the computer. Accordingly, the host device provides a read command to the handheld device, which is received via the host interface 18. The host interface 18 converts the read request into a generic format and provides the request to the processing module 20. The processing module 20 interprets the read request and coordinates the retrieval of the requested data from memory 16 via the memory interface 22. The retrieved data (e.g., Tx data) is provided to the host interface 18, which converts the format of the retrieved data from the generic format of the handheld device into the format of the coupling between the handheld device and the host device. The host interface 18 then provides the formatted data to the host device via the coupling.

The coupling between the host device and the handheld device may be a wireless connection or a wired connection.

For instance, a wireless connection may be in accordance with Bluetooth, IEEE 802.11(a), (b) or (g), and/or any other wireless LAN (local area network) protocol, IrDA, etc. The wired connection may be in accordance with one or more Ethernet protocols, Firewire, USB, etc. Depending on the particular type of connection, the host interface module 18 includes a corresponding encoder and decoder. For example, when the handheld device 10 is coupled to the host device via a USB cable, the host interface module 18 includes a USB encoder and a USB decoder.

As one of average skill in the art will appreciate, the data stored in memory 16, which may have 64 Mbytes or greater of storage capacity, may be text files, presentation files, user profile information for access to varies computer services (e.g., Internet access, email, etc.), digital audio files (e.g., MP3 files, WMA—Windows Media Architecture—, MP3 PRO, Ogg Vorbis, AAC—Advanced Audio Coding), digital video files [e.g., still images or motion video such as MPEG (motion picture expert group) files, JPEG (joint photographic expert group) files, etc.], address book information, and/or any other type of information that may be stored in a digital format. As one of average skill in the art will further appreciate, when the handheld device 10 is coupled to the host device A, B, or C, the host device may power the handheld device 10 such that the battery is unused.

When the handheld device 10 is not coupled to the host device, the processing module 20 executes an algorithm 30 to detect the disconnection and to place the handheld device in a second operational mode. In the second operational mode, the processing module 20 retrieves, and subsequently executes, a second set of operational instructions from memory 16 to support the second operational mode. For example, the second operational mode may correspond to MP3 file playback, digital dictaphone recording, MPEG file playback, JPEG file playback, text messaging display, cellular telephone functionality, and/or AM/FM radio reception. Each of these functions is known in the art, thus no further discussion of the particular implementation of these functions will be provided except to further illustrate the concepts of the present invention.

In the second operational mode, under the control of the processing module 20 executing the second set of operational instructions, the multimedia module 24 retrieves multimedia data 34 from memory 16. The multimedia data 34 includes at least one of digitized audio data, digital video data, and text data. Upon retrieval of the multimedia data, the multimedia module 24 converts the data 34 into rendered output data 36. For example, the multimedia module 24 may convert digitized data into analog signals that are subsequently rendered audible via a speaker or via a headphone jack. In addition, or in the alternative, the multimedia module 24 may render digital video data and/or digital text data into RGB (red-green-blue), YUV, etc., data for display on an LCD (liquid crystal display) monitor, projection CRT, and/or on a plasma type display. The multimedia module 24 will be described in greater detail with reference to FIGS. 2 and 3.

As one of average skill in the art, the handheld device 10 may be packaged similarly to a thumb drive, a cellular telephone, pager (e.g., text messaging), a PDA, an MP3 player, a radio, and/or a digital dictaphone and offer the corresponding functions of multiple ones of the handheld devices (e.g., provide a combination of a thumb drive and MP3 player/recorder, a combination of a thumb drive, MP3 player/recorder, and a radio, a combination of a thumb drive, MP3 player/recorder, and a digital dictaphone, combination of a thumb drive, MP3 player/recorder, radio, digital dictaphone, and cellular telephone, etc.).

Figure 2:
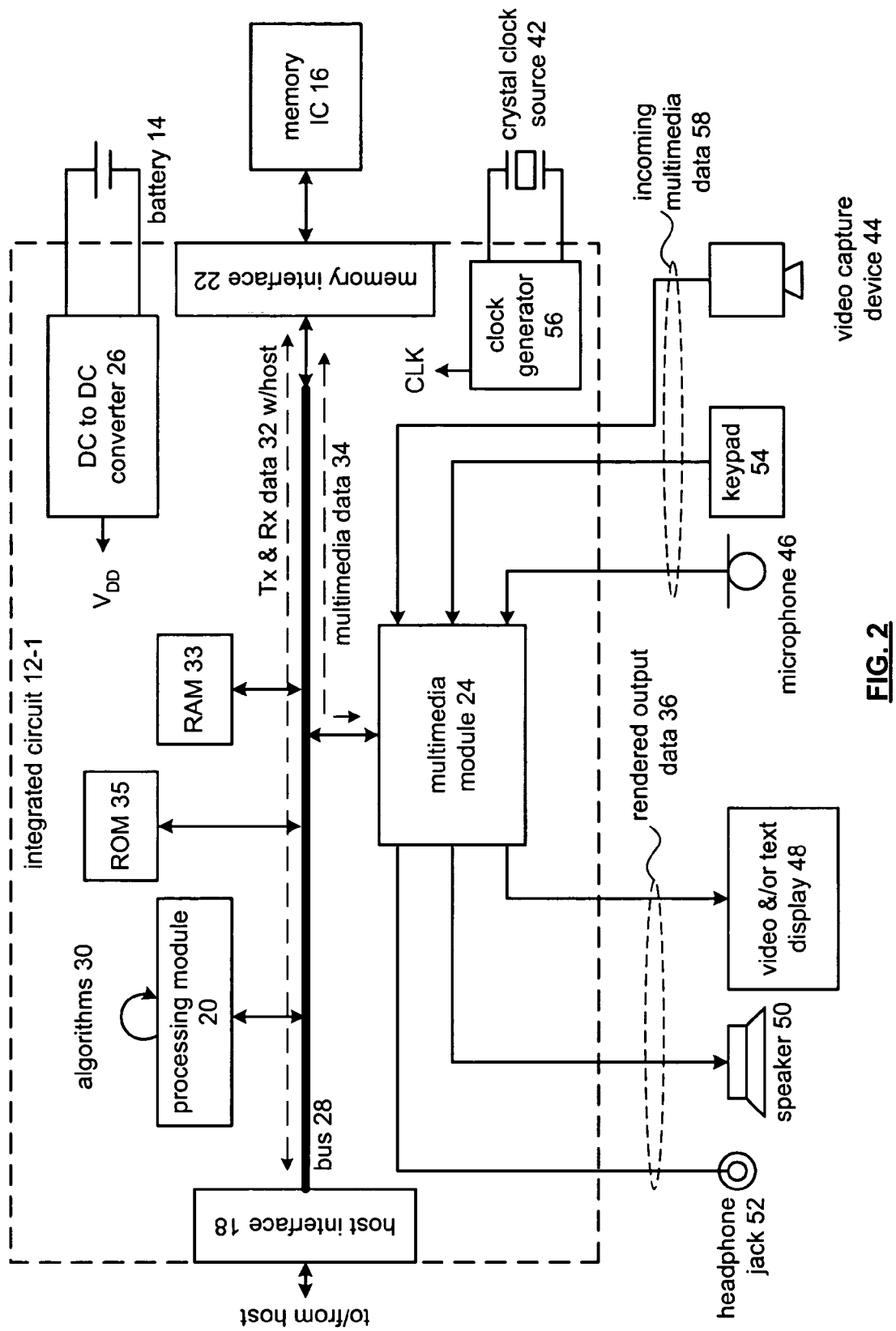
FIG. 2 is a schematic block diagram of another handheld device and corresponding integrated circuit in accordance with the present invention.

FIG. 2 is a schematic block diagram of another handheld device 40 and a corresponding integrated circuit 12-1. In this embodiment, the handheld device 40 includes the integrated circuit 12-1, the battery 14, the memory 16, a crystal clock source 42, one or more multimedia input devices (e.g., one or more video capture device(s) 44, keypad(s) 54, microphone(s) 46, etc.), and one or more multimedia output devices (e.g., one or more video and/or text display(s) 48, speaker(s) 50, headphone jack(s) 52, etc.). The integrated circuit 12-1 includes the host interface 18, the processing module 20, the memory interface 22, the multimedia module 24, the DC-to-DC converter 26, and a clock generator 56, which produces a clock signal (CLK) for use by the other modules. As one of average skill in the art will appreciate, the clock signal CLK may include multiple synchronized clock signals at varying rates for the various operations of the multi-function handheld device.

Handheld device 40 functions in a similar manner as handheld device 10 when exchanging data with the host device (i.e., when the handheld device is in the first operational mode). In addition, while in the first operational mode, the handheld device 40 may store digital information received via one of the multimedia input devices 44, 46, and 54. For example, a voice recording received via the microphone 46 may be provided as multimedia input data 58, digitized via the multimedia module 24 and digitally stored in memory 16. Similarly, video recordings may be captured via the video capture device 44 (e.g., a digital camera, a camcorder, VCR output, DVD output, etc.) and processed by the multimedia module 24 for storage as digital video data in memory 16. Further, the keypad 54 (which may be a keyboard, touch screen interface, or other mechanism for inputting text information) provides text data to the multimedia module 24 for storage as digital text data in memory 16. In this extension of the first operational mode, the processing module 20 arbitrates write access to the memory 16 among the various input sources (e.g., the host and the multimedia module).

When the handheld device 40 is in the second operational mode (i.e., not connected to the host), the handheld device may record and/or playback multimedia data stored in the memory 16. Note that the data provided by the host when the handheld device 40 was in the first operational mode includes the multimedia data. The playback of the multimedia data is similar to the playback described with reference to the handheld device 10 of FIG. 1. In this embodiment, depending on the type of multimedia data 34, the rendered output data 36 may be provided to one or more of the multimedia output devices. For example, rendered audio data may be provided to the headphone jack 52 an/or to the speaker 50, while rendered video and/or text data may be provided to the display 48.

The handheld device 40 may also record multimedia data 34 while in the second operational mode. For example, the handheld device 40 may store digital information received via one of the multimedia input devices 44, 46, and 54.

Figure 3:
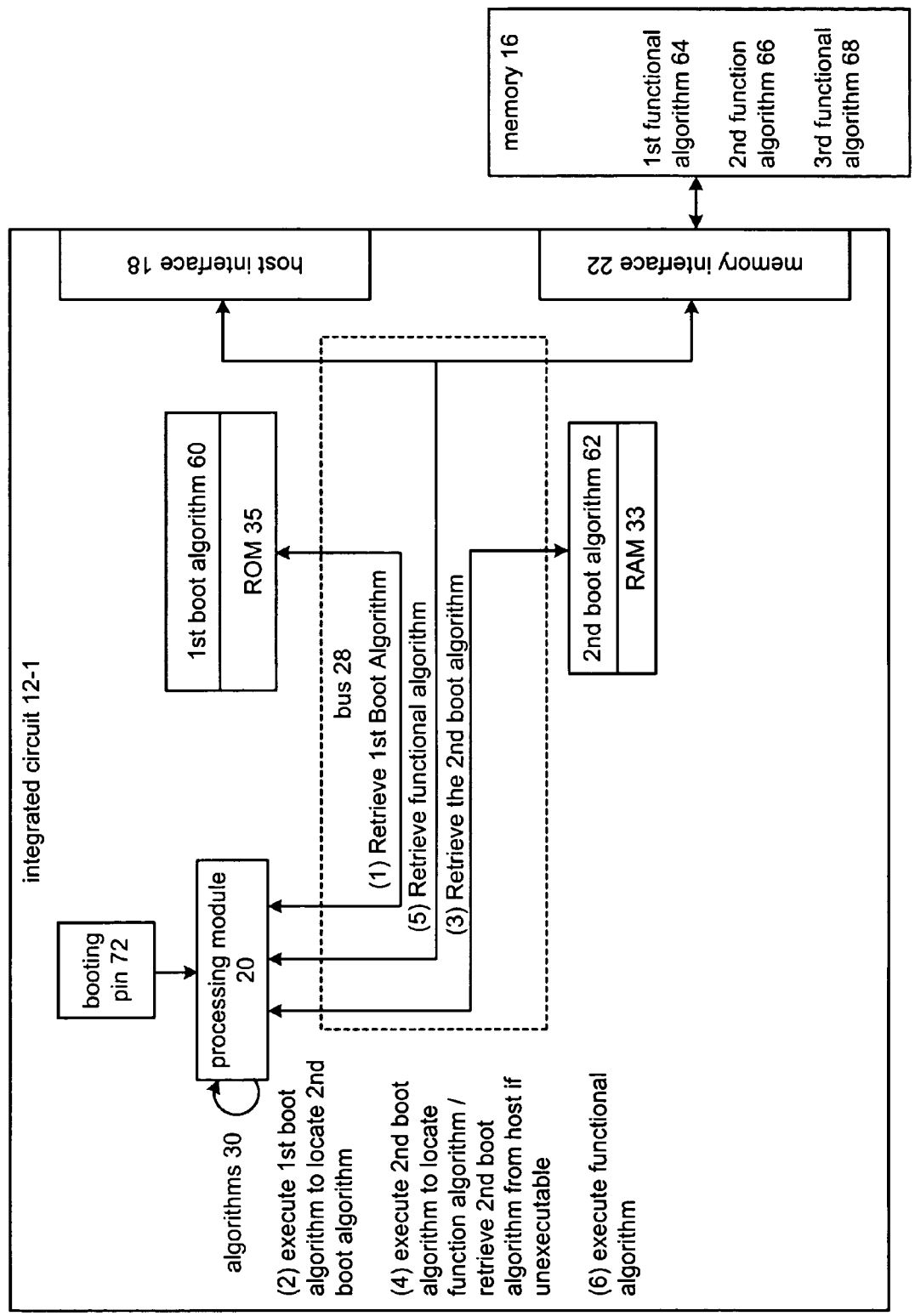
FIG. 3 is a schematic block diagram of an integrated circuit in accordance with the present invention that describes the initialization process of the integrated circuit.

FIG. 3 provides a schematic diagram illustrating the initialization process or "booting up" process of multiple function devices having integrated circuit 12-1. Integrated circuit 12-1 includes processing module 20, read-only memory 35 having a $1^{st}$ boot algorithm 60, RAM 33 that may contain a $2^{nd}$ boot algorithm 62, bus 28, booting pins 72, host interface 18, memory interface 22, and memory 16 capable of storing functional algorithms such as functional algorithms 64, 66 and 68.

At initialization processing module 20 retrieves $1^{st}$ boot algorithm 60 from ROM 35. Processing module 20 then (2) executes the $1^{st}$ boot to identify the location of the $2^{nd}$ boot algorithm 62 based on initialization inputs or booting pins 72. The location of the functional algorithm may be in an on-chip memory location such as RAM 33 or be accessible via off-chip memory through memory interface 22 to memory 16. As shown, memory 16 contains, $2^{nd}$ boot algorithm 62B and three functional algorithms that correspond to three different functional modes in which integrated circuit 12-1 will operate. Processing module 20 (3) retrieves the functional algorithm from the identified location whether that be on-chip within RAM 33 or off-chip within memory 16 or another off-chip location. When retrieval is unsuccessful, processing module 20 (4) retrieves the specified functional algorithm from an alternate location if integrated circuit 12 is coupled to host device 70 as illustrated in FIG. 4.

In FIG. 3 integrated circuit 12 is not shown as being operably coupled to host device 70. In this instance, processing module 20 waits a predetermined period of time to couple to a host device 70 and retrieve the specified functional algorithm or a default functional algorithm from the host device 70. At the expiration of the predetermined period of time, integrated circuit 12-1 powers down based on its inability to boot-up in the identified functional mode.

Figure 4:
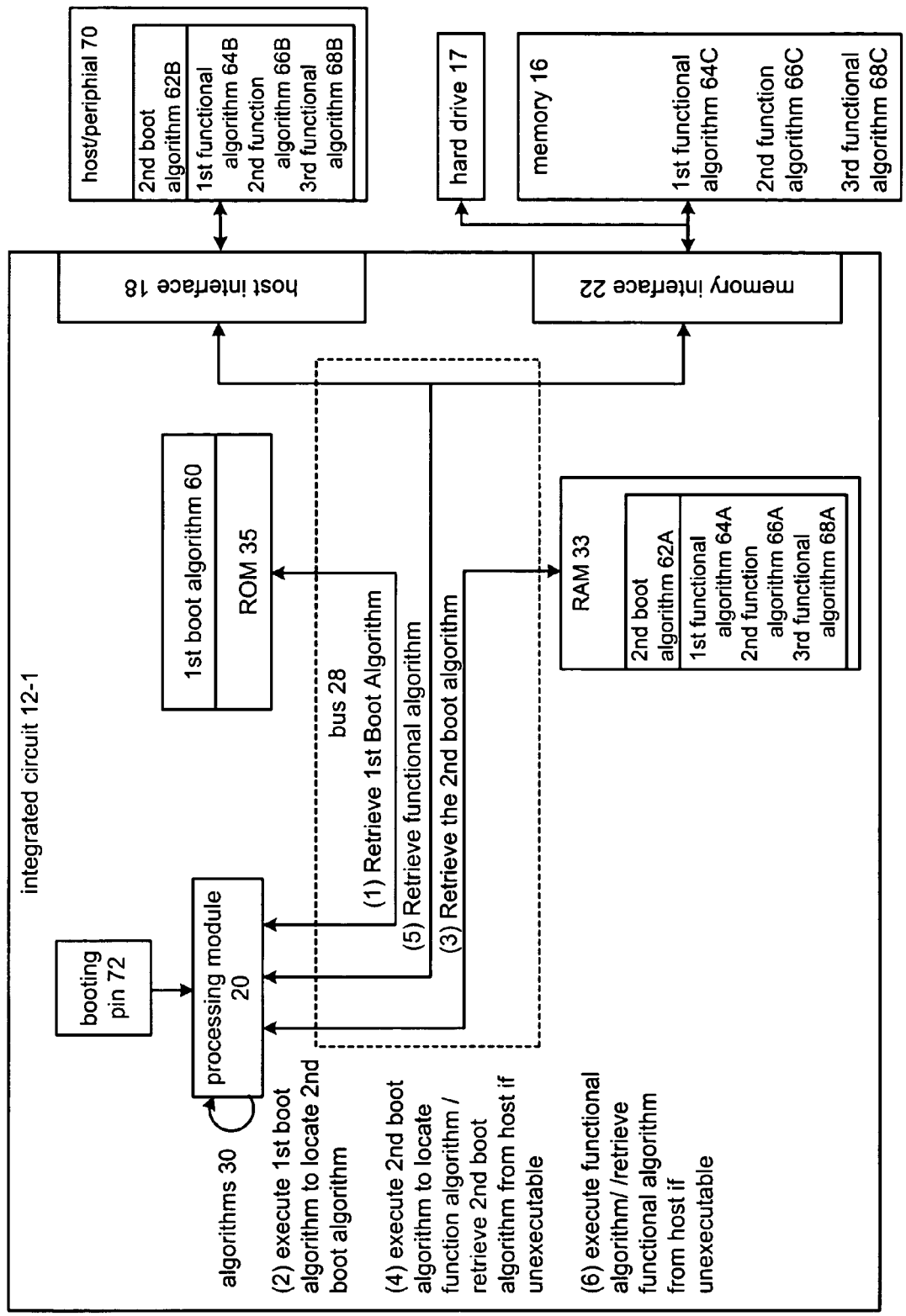
FIG. 4 is a schematic block diagram of a integrated circuit that describes the initialization process of the integrated circuit when coupled to a host device.

FIG. 4 is a schematic that illustrates how integrated circuit 12-1 boots up from a variety of sources. Integrated circuit 12-1 includes processing module 20, RAM 35, RAM 33, host interface 18, memory interface 22, booting pins 72 and bus 28 that operably couples the above described components of integrated circuit 12-1. In addition to those elements from FIG. 3, FIG. 4 depicts integrated circuit 12-1 as being operably coupled to host 70, memory 16, and hard drive 17.

At initialization or upon detecting an event that triggers the booting up of the integrated circuit 12-1 processing module 20 (1) retrieves a $1^{st}$ boot algorithm 60 from RAM 35. The complexity of $1^{st}$ boot algorithm is reduced in size and scope to only those functions necessary to identify the location of further instructions. These further instructions configure the multiple function device in a desired configuration. Processing module 20 (2) executes the $1^{st}$ boot algorithm 60 to identify the location of the $2^{nd}$ boot algorithm 62. 2nd boot algorithm 62 may be located in RAM 33, host/peripherals 70, off-chip memory 16, hard drive 17 or another memory device as is known to those skilled in the art.

The $2^{nd}$ boot algorithm is (3) retrieved for processing module 20. If the retrieval is successful, then $2^{nd}$ boot algorithm is (4) executed to identify the location of the functional algorithm used to configure the multiple function device in one of a variety of functional modes. These functional modes may include a digital audio or digital multimedia player or recorder, a file storage device, an extended memory device, a personal data assistant, or other like devices known to those skilled in the art. If the retrieval is unsuccessful, a default $2^{nd}$ boot algorithm contained within host 70 may be (5) retrieved and executed by processing module 20. The $2^{nd}$ boot algorithm contained within host/peripheral 70 may allow integrated circuit 12-1 to be configured in a default configuration such as a file storage device or extended memory device. Additionally, when in the default mode of operation, a user may elect to repair the $2^{nd}$ boot algorithm, which the device was unable to retrieve. By minimizing the $1^{st}$ boot algorithm the $2^{nd}$ boot algorithm that may be contained within read/writable memory may be repaired if an error exists in the $2^{nd}$ boot algorithm. This allows multiple function devices having errors in their boot algorithms to be remotely repaired by end users rather than being returned to the vendor. The default configuration does not automatically repair the $2^{nd}$ boot algorithm or functional algorithm which integrated circuit 12-1 was unable to execute, rather a user must direct that these algorithms be repaired.

If integrated circuit 12-1 is unable to retrieve the identified $2^{nd}$ boot algorithm and unable to retrieve a default $2^{nd}$ boot algorithm from a host/peripheral 70, integrated circuit 12-1 may wait a predetermined period of time and then power down. Executing the $2^{nd}$ boot algorithm identifies the location of the functional algorithm used to configure integrated circuit 12 into a particular mode of operation. A variety of functional algorithms may be stored in a variety of places. To illustrate this functional algorithm 64A, functional algorithm 66A, and functional algorithm 68A are stored in RAM 33. Functional algorithm 64B, functional algorithm 66B and functional algorithm 68B are stored in memory 16. Functional algorithm 64C, functional algorithm 66C, and functional algorithm 68C are stored within a host/peripheral 70. These functional algorithms may be stored in any accessible memory location. These memory locations may include extended memory coupled to device to integrated circuit 12 via a universal serial bus (USB) connection, flash memory, EPROM, I2C memory devices, removable disk memory, hard drive memory, and other memory locations known to those skilled in the art.

When the retrieval is successful, the functional algorithm is (6) executed. Otherwise, the functional algorithm is retrieved from host/peripheral 70 or another alternative location when connected. Alternatively, after waiting a predetermined period of time for integrated circuit 12-1 to operably couple to host 70 and retrieve the functional algorithm. If the retrieval does not occur, integrated circuit 12 may power down after waiting the predetermined period of time.

Figure 5:
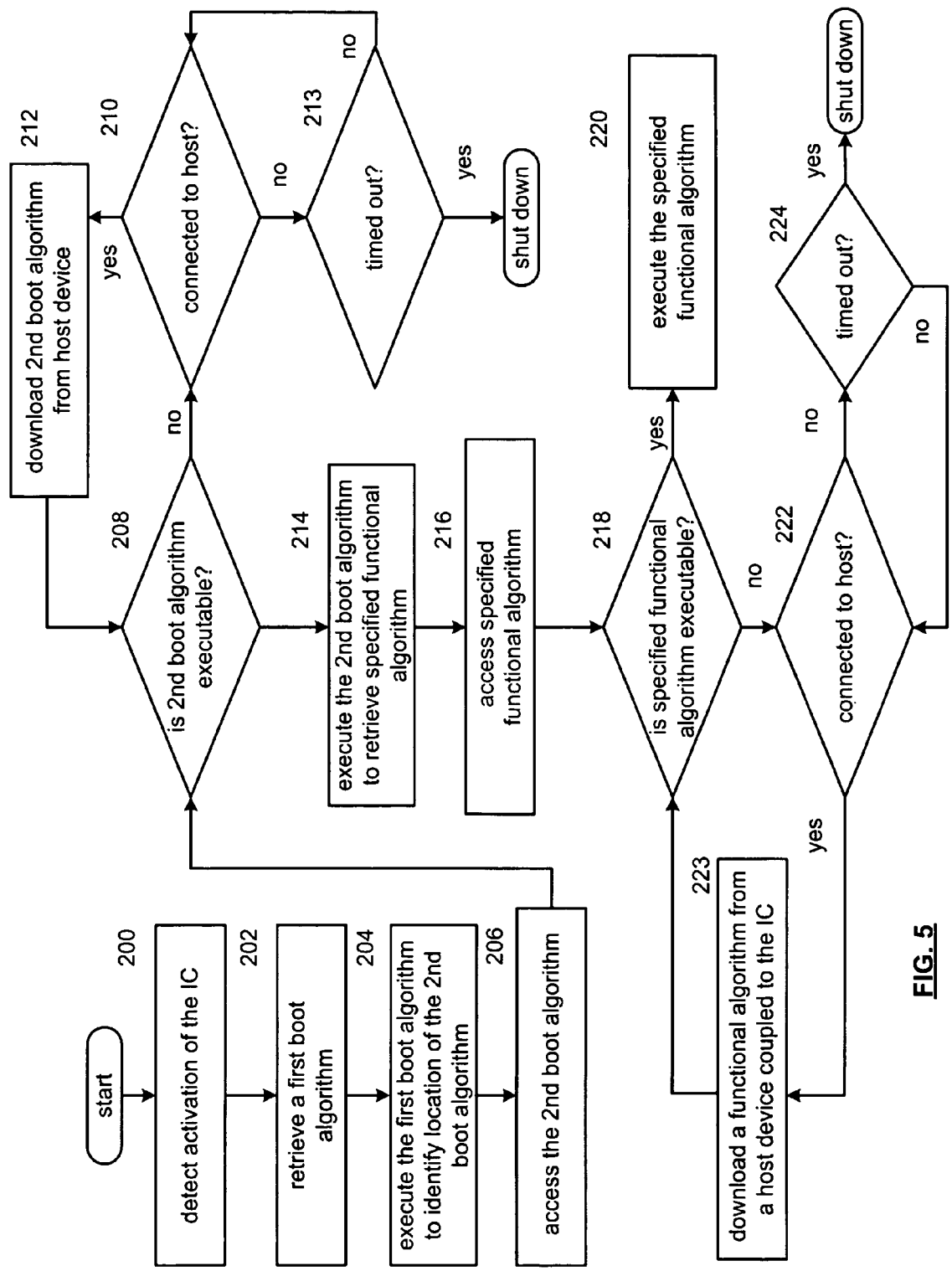
FIG. 5 is a logic flow diagram that provides a method of initializing an integrated circuit in accordance with the present invention.

FIG. 5 is a logic flow diagram depicting the method of initializing a multiple function device in accordance with the present invention. At Step 200, the activation of the integrated circuit is detected. The $1^{st}$ boot algorithm is retrieved in Step 202. The retrieved $1^{st}$ boot algorithm is executed in Step 204 to identify the location of the $2^{nd}$ boot algorithm. In Step 206, the $2^{nd}$ boot algorithm is accessed. A determination is made at decision point 208 as to whether or not the $2^{nd}$ boot algorithm is executable. If the $2^{nd}$ boot algorithm is not executable, then a determination is made at decision point 210 as to whether or not the integrated circuit is coupled to a host device. When the integrated circuit is coupled to a host device, the $2^{nd}$ boot algorithm is downloaded or retrieved from the host device in Step 212 and the process returns to decision point 208. When the functional device is not coupled to a host, the device waits a predetermined period of time to couple to the host. At the expiration of this predetermined period of time, the device is secured within decision loop 213.

When the $2^{nd}$ boot algorithm is executable, it is executed in Step 214 to identify a storage location of a functional algorithm associated with the configuration of the multiple function device. At Step 216, the specified functional algorithm is accessed and retrieved. At decision point 218 a determination is made as to whether or not the retrieved functional algorithm is executable. When the functional algorithm is executable the multiple function device is configured according to the specified functional algorithm in Step 220. Otherwise, a determination is made as to whether or not the multiple function device is connected to a host in Step 222, wherein if the device is coupled to a host, the functional algorithm or another default functional algorithm is retrieved in Step 223 and the process returns to decision point 218. When the functional device is not coupled to a host, the device waits a predetermined period of time to couple to the host. At the expiration of this predetermined period of time, the device is secured within decision loop 224.

Figure 6:
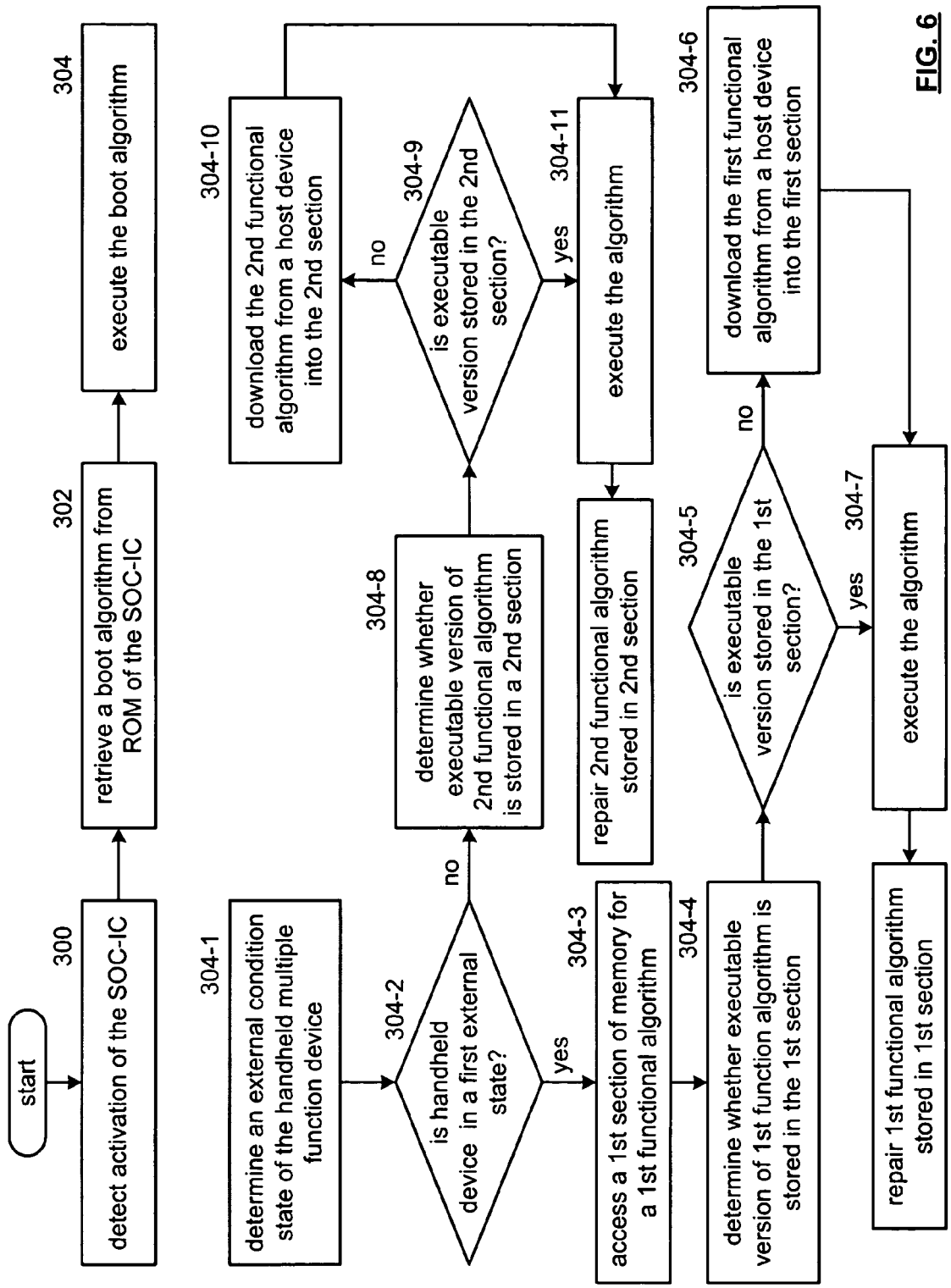
FIG. 6 is a logic diagram of a method for loading and/or programming a system on a chip in accordance with the present invention.

FIG. 6 is a logic diagram of a method for booting up, and/or programming a system-on-a-chip integrated circuit that is used in a handheld multiple function device. The process begins at Step 300 where activation of the system-on-a-chip integrated circuit is detected. This may also include the detection of a reset of the system-on-a-chip. For example, to activate a reset of the system-on-a-chip, the play button of the handheld device may be held for 5 seconds. Having detected the activation of the system-on-a-chip, the process proceeds to Step 302 where a boot algorithm is retrieved from on-chip ROM of the system-on-a-chip. The process then proceeds to Step 304 where the boot algorithm is executed.

Processing Steps 304-1 through 304-12 illustrate the execution of the boot algorithm. At Step 304-1 an external condition state of the handheld functional device is determined. The external condition may correspond to the device being coupled to a host or not coupled to a host. The process then proceeds to Step 304-2 where a determination is made as to whether the device is in a $1^{st}$ external state. The $1^{st}$ external state may correspond to when the device is a portable unit and a $2^{nd}$ external state may correspond to when the handheld device is coupled to a host. If the device is in a $1^{st}$ external state (e.g., is functioning as a portable device) the process proceeds to Step 304-3. At Step 304-3 a $1^{st}$ section of memory is accessed for a $1^{st}$ functional algorithm. For example, the $1^{st}$ functional algorithm may correspond to MP3 playback, voice dictation record, WMA playback, et cetera. The process then proceeds to Step 304-4 to determine whether an executable version of the $1^{st}$ functional algorithm is stored in the $1^{st}$ section of the system memory of the handheld device. An executable version is one that is stored and is not corrupted.

The process then proceeds to Step 304-5 where the processing branch is based on whether an executable version is stored in the $1^{st}$ section. When the executable version is not stored, the process proceeds to Step 304-6 where the $1^{st}$ functional algorithm is downloaded from a host device into the $1^{st}$ section of memory. To download the $1^{st}$ functional algorithm, the handheld device must be coupled to the host device.

If the $1^{st}$ version is executable and/or has been downloaded and is thus executable, the process proceeds to Step 304-7 where the $1^{st}$ functional algorithm is executed. Additionally, if needed, the $1^{st}$ functional algorithm stored in the $1^{st}$ section may be repaired in step 304-12.

If the handheld device is in a $2^{nd}$ external state, the process proceeds to Step 304-8 where a determination is made as to whether a $2^{nd}$ executable version of the functional algorithm is stored in a $2^{nd}$ section of memory. This executable version may correspond to a file storage algorithm, a USB interface algorithm, and/or any other type of algorithm that facilitates the communication between a handheld device and a host device.

The process then proceeds to Step 304-9 where the processing branch is based on whether the executable version of the $2^{nd}$ functional algorithm is stored in a $2^{nd}$ section of the memory of the system memory. If not, the process proceeds to Step 304-10 where the $2^{nd}$ functional algorithm is downloaded from the host device into the $2^{nd}$ section of memory. Once an executable version of the $2^{nd}$ functional algorithm is stored in the system memory, the process proceeds to Step 354-11 where the executable algorithm is executed. If needed the $2^{nd}$ function algorithm is repaired in step 304-13.

Figure 7:
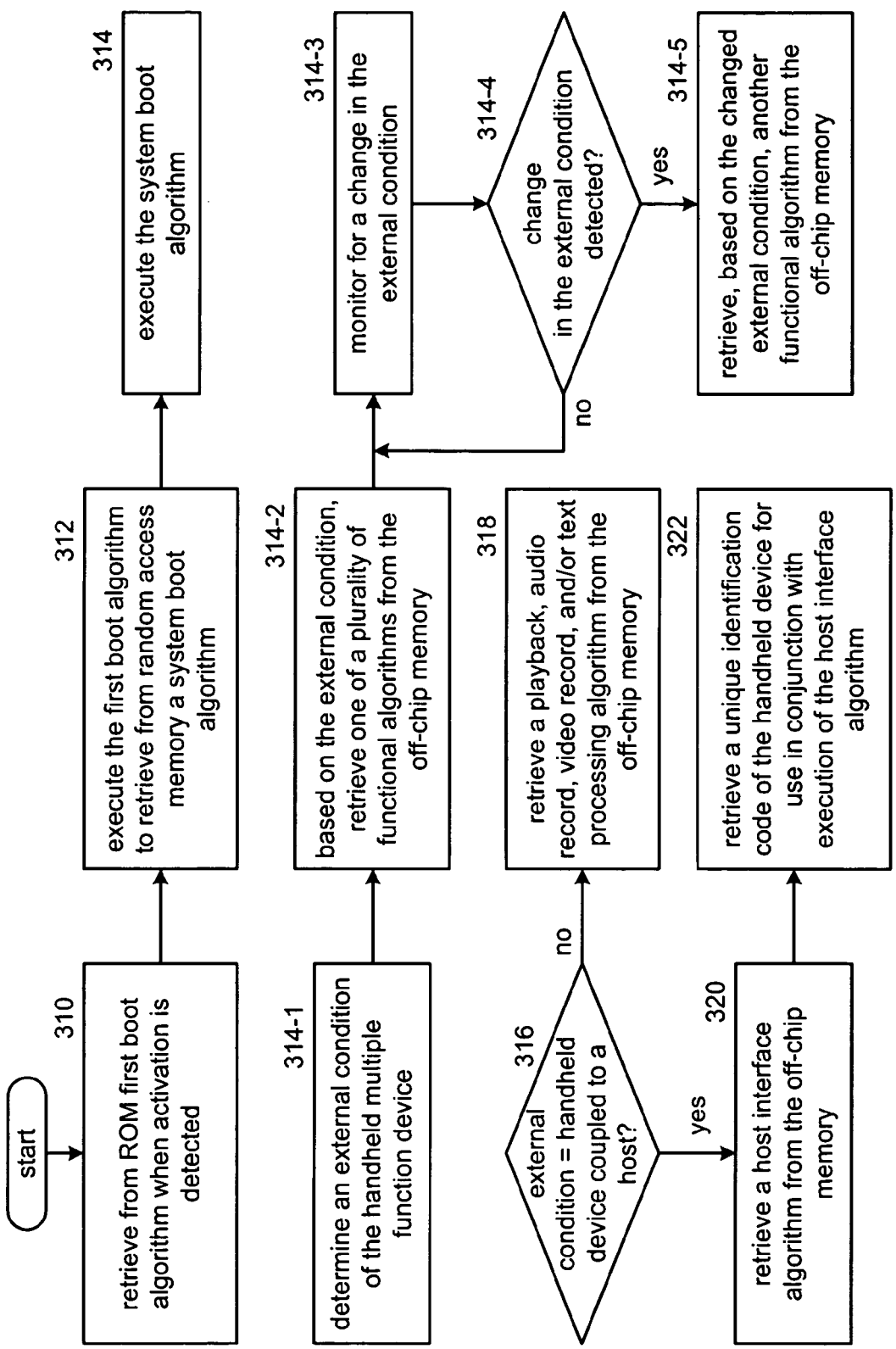
FIG. 7 is a logic diagram of a method for booting up a system on a chip in accordance with the present invention.

FIG. 7 is a logic diagram of a method for booting a system-on-a-chip integrated circuit that may be used in a handheld multi-functional device. The process begins at Step 310 where a skeletal boot algorithm is retrieved from on-chip RAM when the SOC-IC is activated. The process then proceeds to Step 312 where the skeletal boot algorithm is executed to retrieve from an off-chip RAM a system boot algorithm. The process then proceeds to Step 314 where the system boot algorithm is executed.

The execution of the system boot algorithm is further illustrated with respect to Steps 314-1 through 314-5. At Step 314-1, the processing module of the SOC-IC determines the external condition of the handheld multiple function device. This may be done as illustrated with respect to Steps 316–322. At Step 316, the processing unit determines whether the external condition corresponds to the handheld device being coupled to a host. If not, the process proceeds to Step 318 where the processing module retrieves a playback, audio record, video record and/or text processing algorithm from the off-chip system memory.

If, however, the external condition corresponds to the handheld device being coupled to the host, the process proceeds to Step 320. At Step 320, the processing module retrieves a host interface algorithm from the off-chip memory. The process then proceeds to Step 322 where the processing module retrieves a unique identification code of the handheld device for use in conjunction with the execution of the host interface algorithm. For example, if the host interface algorithm corresponds to a USB interface algorithm (e.g., version 1, 2, et cetera), in accordance with the standard, each device must have a USB identification code. This code may be stored in the off-chip RAM for ease of manufacturing a USB interface compliant device and used when the USB interface algorithm is executed.

Returning to the execution of the system boot algorithm the process proceeds to Step 314-2. At Step 314-2, the processing unit, based on the external condition, retrieves one of a plurality of functional algorithms from the off-chip memory. The functional algorithm may correspond to a file system algorithm when the device is coupled to a host for facilitating storage of data received from the host or may correspond to a playback algorithm when the handheld device is not coupled to the host.

The process then proceeds to Step 314-3 where the processing module monitors for a change in the external condition. The process then proceeds to Step 314-4 where the processing module branches its functionality based on whether an external condition has changed. If so, the process proceeds to Step 314-5 where the processing module retrieves, based on the external changed external condition, another functional algorithm from the off-chip memory. For example, if the device was in a portable mode, the processing module was executing a playback algorithm or record algorithm et cetera. When the external condition has changed such that the handheld device is coupled to a host, the processing module retrieves a file system algorithm as well as the interface algorithm.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. A method for booting up a multiple function device, the method comprises:
    determining a configuration state of the multiple function device;
    selecting one of a plurality of functional modes based on the configuration state;
    accessing memory of the multiple function device to retrieve a boot algorithm comprising a first boot algorithm and a second boot algorithm wherein the second boot algorithm corresponds to the one of the plurality of functional modes;
    determining whether the second boot algorithm is executable;
    when the second boot algorithm is not executable, determining whether the multiple function device is operably coupled to a host;
    when the multiple function device is operably coupled to the host, downloading the second boot algorithm from the host; and
    executing the first boot algorithm and second boot algorithm.

2. The method of claim 1 wherein the plurality of functional modes comprises at least two of:
    a digital audio player;
    a file storage;
    a digital multimedia player;
    an extended memory device;
    a digital audio recorder;
    a digital multimedia recorder;
    a personal data assistant; and
    an extended memory device with a set of instructions to repair a second boot algorithm.

3. The method of claim 1 wherein the second boot algorithms configures the multiple function device as an extended memory device when the multiple function device is operably coupled to the host.

4. The method of claim 3, wherein the extended memory device receives a set of instructions to repair the second boot algorithm corresponding to the plurality of functional modes from the host.

5. The method of claim 1, wherein downloading the second boot algorithm occurs prior to expiration of a time out period when the multiple function device is operably coupled to the host.

6. The method of claim 5, further comprising shutting down the multiple function device after expiration of a time out period when the multiple function device is not operably coupled to the host.

7. The method of claim 1, wherein the configuration state includes booting inputs that comprise boot pins and wherein a location of the second boot algorithm is specified by the configuration state.

8. The method of claim 5, wherein the location of the second boot algorithm corresponds to an accessible memory location selected from the group consisting of:
    universal serial bus (USB) extended memory;
    flash memory;
    EPROM;
    I2C memory device;
    removable disk memory; and
    hard-drive memory.

9. The method of claim 1, wherein an event that triggers booting up comprises a change in status of an operable connection between the multiple function device and the host.

10. The method of claim 9, wherein an initial status of the operable connection is a $1^{st}$ external state, and wherein following the change the operable connection is a $2^{nd}$ external state.

11. The method of claim 10, wherein in the $1^{st}$ external state the multiple function device is operably coupled to the host and wherein in the $2^{nd}$ external state the multiple function device is not operably coupled to any host.

12. The method of claim 10, wherein in the $1^{st}$ external state the multiple function device is not operably coupled to any host and wherein in the $2^{nd}$ external state the multiple function is operably coupled to the host.

13. The method of claim 10, wherein in the $1^{st}$ external state the multiple function device is operably coupled to a first host and wherein in the $2^{nd}$ external state the multiple function device is operably coupled to a second host.

14. An apparatus for booting up a multiple function device, the apparatus comprises:
    processing module;
    read only memory; and
    memory, wherein the processing module functions to:
        determine a configuration state of the multiple function device;
        select one of a plurality of functional modes based on the configuration state;
        access memory of the multiple function device to retrieve a boot algorithm comprising a first boot algorithm and a second boot algorithm wherein the second boot algorithm corresponding to the one of the plurality of functional modes;
        determine whether the second boot algorithm is executable;
        determine whether the multiple function device is operably coupled to a host, when the second boot algorithm is not executable;
        download the second boot algorithm from the host, when the multiple function device is operably coupled to the host; and execute the first boot algorithm and second boot algorithm.

15. The apparatus of claim 14, wherein the plurality of functional modes comprises at least two of:
  a digital audio player;
  a file storage;
  a digital multimedia player;
  an extended memory device;
  a digital audio recorder;
  a digital multimedia recorder;
  a personal data assistant; and
  an extended memory device with a set of instructions to repair a second boot algorithm.

16. The apparatus of claim 14, wherein the first boot algorithm and second boot algorithm configure the multiple function device as an extended memory device when the multiple function device is operably coupled to the host.

17. The apparatus of claim 14, wherein the processing module further functions to repair the second boot algorithm when the second boot algorithm is not executable.

18. The apparatus of claim 14, wherein downloading the second boot algorithm occurs prior to expiration of a time out period when the multiple function device is operably coupled to the host.

19. The apparatus of claim 18, further comprising shutting down the multiple function device after expiration of a time out period when the multiple function device is not operably coupled to the host.

20. The apparatus of claim 14, wherein the configuration state includes booting inputs that comprise boot pins and wherein a location of the second boot algorithm is specified by the configuration state.

21. The apparatus of claim 20, wherein the location of the second boot algorithm corresponds to an accessible memory location selected from the group consisting of:
  universal serial bus (USB) extended memory;
  flash memory;
  EPROM;
  I2C memory device;
  removable disk memory; and
  hard-drive memory.

22. The apparatus of claim 14, wherein an event that triggers booting up comprises a change in status of an operable connection between the multiple function device and the host.

23. The apparatus of claim 22, wherein an initial status of the operable connection is a $1^{st}$ external state, and wherein following the change the operable connection is a $2^{nd}$ external state.

24. The apparatus of claim 23, wherein in the $1^{st}$ external state the multiple function device is operably coupled to the host and wherein in the $2^{nd}$ external state the multiple function device is not operably coupled to any host.

25. The apparatus of claim 23, wherein in the $1^{st}$ external state the multiple function device is not operable coupled to any host and wherein in the $2^{nd}$ external state the multiple function is operable coupled to the host.

26. The apparatus of claim 23, wherein in the $1^{st}$ external state the multiple function device is operable coupled to a first host and wherein in the $2^{nd}$ external state the multiple function device is operable coupled to a second host.

* * * * *